(12) United States Patent
Masberg et al.

(10) Patent No.: US 6,281,646 B1
(45) Date of Patent: *Aug. 28, 2001

(54) DRIVE SYSTEM WITH DRIVE-MOTOR, ELECTRIC MACHINE AND BATTERY

(75) Inventors: Ullrich Masberg, Rösrath; Thomas Pels, Achern; Klaus-Peter Zeyen, Köln; Andreas Gründl, München; Bernhard Hoffmann, Starnberg, all of (DE)

(73) Assignees: ISAD Electronic Systems GmbH & Co. KG, Cologne; Grundl und Hoffmann GmbH, Starnberg, both of (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,522

(22) Filed: Feb. 27, 1998

Related U.S. Application Data (63) Continuation of application No. PCT/DE96/01663, filed on Aug. 31, 1996.

(30) Foreign Application Priority Data

Aug. 31, 1995 (DE) ............................................. 195 32 163
Aug. 31, 1995 (DE) ............................................. 195 32 135

(51) Int. Cl.[7] ........................... H02P 5/00; H02P 5/46; B60K 41/02
(52) U.S. Cl. .................... 318/139; 318/146; 180/65.3; 477/5
(58) Field of Search .................. 318/139, 50, 67, 318/146, 9, 10, 432, 87, 64, 140, 77, 376; 477/5, 179, 8, 13; 180/65.4, 65.2, 65.3, 69.3; 60/716, 711; 290/45

(56) References Cited

U.S. PATENT DOCUMENTS

| | | | |
|---|---|---|---|
| 2,654,849 | 10/1953 | Trofimov | 310/99 |
| 2,790,917 | 4/1957 | Trofimov | 310/102 |
| 3,774,303 | 11/1973 | Burkett et al. | 30/382 |
| 3,870,116 | 3/1975 | Seliber | 180/54 R |
| 3,902,073 | 8/1975 | Lafuze | 290/46 |

(List continued on next page.)

FOREIGN PATENT DOCUMENTS

| | | |
|---|---|---|
| 58401-73 | 1/1975 | (AU) . |
| 282 671 | 8/1912 | (DE) . |
| 874 713 | 6/1952 | (DE) . |
| 893 299 | 1/1953 | (DE) . |
| 904 737 | 6/1953 | (DE) . |

(List continued on next page.)

OTHER PUBLICATIONS

L. Kung et al., "Hybrid III: Concepts for the Electric System of a Hybrid Passenger Car, Symp Proc 11th Int Electric Vehic Symp NA (NA) NA 1992", pp. 13 total.

Manfred Weck, Studium Und Praxis, Werkzeugmaschinen Fertigungssysteme Band 3.2 Automatisierung und Steuerungstechnik 2, *VDI Verlag*, Apr. 1995, pp. 8 pgs total.

(List continued on next page.)

*Primary Examiner*—Paul Ip
(74) *Attorney, Agent, or Firm*—Blakely, Sokoloff, Taylor & Zafman LLP (57) ABSTRACT

The invention concerns a drive system with a drive motor (1), especially the internal combustion engine of a motor vehicle, an electric machine (4), which provides additional driving action, and at least one short-duty battery (11), which furnishes at least some of the energy required during the driving action of the electric machine (4).

37 Claims, 5 Drawing Sheets

U.S. PATENT DOCUMENTS

| | | | |
|---|---|---|---|
| 3,974,396 | 8/1976 | Schönball | 290/54 |
| 4,025,860 | 5/1977 | Shibata et al. | 320/3 |
| 4,066,936 | 1/1978 | Hirota | 318/139 |
| 4,187,436 * | 2/1980 | Etienne | 290/27 |
| 4,305,254 * | 12/1981 | Kawakatsu et al. | 60/716 |
| 4,346,773 | 8/1982 | Hofbauer et al. | 180/165 |
| 4,407,132 * | 10/1983 | Kawakatsu et al. | 60/716 |
| 4,699,097 | 10/1987 | Tanaka et al. | 123/192 |
| 4,797,602 | 1/1989 | West | 322/10 |
| 4,803,376 | 2/1989 | N'Guyen | 290/22 |
| 4,825,139 | 4/1989 | Hamelin et al. | 322/90 |
| 4,883,973 | 11/1989 | Lakey et al. | 290/31 |
| 4,942,950 | 7/1990 | Watanabe et al. | 192/0.096 |
| 4,958,095 | 9/1990 | Uchida et al. | 310/59 |
| 5,053,632 | 10/1991 | Suzuki et al. | 290/45 |
| 5,109,815 | 5/1992 | Maeda et al. | 123/192.1 |
| 5,125,236 | 6/1992 | Clancey et al. | 62/115 |
| 5,126,641 | 6/1992 | Putman et al. | 318/128 |
| 5,172,439 | 12/1992 | Härer et al. | 307/10.1 |
| 5,285,862 * | 2/1994 | Furutani et al. | 180/65.4 |
| 5,303,794 | 4/1994 | Hrovat et al. | 180/197 |
| 5,323,743 | 6/1994 | Kristiansson | 123/179.3 |
| 5,325,042 | 6/1994 | Murugan | 322/10 |
| 5,359,308 | 10/1994 | Sun et al. | 335/216 |
| 5,431,241 | 7/1995 | May et al. | 180/197 |
| 5,513,718 * | 5/1996 | Suzuki et al. | 180/65.2 |
| 5,552,681 * | 9/1996 | Suzuki et al. | 318/139 |
| 5,804,934 * | 9/1998 | Yamada et al. | 318/77 |
| 5,848,659 * | 12/1998 | Karg et al. | 180/65.4 |
| 5,873,801 * | 2/1999 | Taga et al. | 477/5 |
| 5,903,113 * | 5/1999 | Yamada et al. | 318/10 |
| 5,905,346 * | 5/1999 | Yamada et al. | 318/50 |

FOREIGN PATENT DOCUMENTS

| | | |
|---|---|---|
| 938 680 | 6/1954 | (DE) . |
| 1 077 072 | 3/1960 | (DE) . |
| 1 156 319 | 10/1963 | (DE) . |
| 1 165 422 | 3/1964 | (DE) . |
| 1 284 853 | 12/1968 | (DE) . |
| 23 45 018 A1 | 4/1974 | (DE) . |
| 23 53 724 B2 | 5/1974 | (DE) . |
| 27 04 533 A1 | 8/1978 | (DE) . |
| 28 55 886 A1 | 6/1979 | (DE) . |
| 29 02 376 C2 | 7/1979 | (DE) . |
| 28 23 225 A1 | 11/1979 | (DE) . |
| 29 17 139 A1 | 11/1980 | (DE) . |
| 29 43 563 A1 | 5/1981 | (DE) . |
| 30 09 503 A1 | 9/1981 | (DE) . |
| 30 13 424 A1 | 10/1981 | (DE) . |
| 30 48 972 C2 | 7/1982 | (DE) . |
| 30 50 269 A1 | 10/1982 | (DE) . |
| 32 30 121 A1 | 2/1984 | (DE) . |
| 32 30 607 A1 | 2/1984 | (DE) . |
| 32 43 513 A1 | 5/1984 | (DE) . |
| 33 43 018 C2 | 6/1984 | (DE) . |
| 32 43 514 C2 | 9/1984 | (DE) . |
| 33 35 923 A1 | 9/1984 | (DE) . |
| 33 38 548 A1 | 5/1985 | (DE) . |
| 35 37 994 A1 | 5/1986 | (DE) . |
| 37 37 192 A1 | 7/1988 | (DE) . |
| 38 14 484 A1 | 11/1988 | (DE) . |
| 37 43 289 A1 | 6/1989 | (DE) . |
| 37 43 317 c3 | 6/1989 | (DE) . |
| 38 12 296 A1 | 11/1989 | (DE) . |
| 39 37 082 A1 | 5/1990 | (DE) . |
| 39 26 054 A1 | 2/1991 | (DE) . |
| 40 27 664 A1 | 3/1991 | (DE) . |
| 39 39 695 C1 | 5/1991 | (DE) . |
| 40 38 301 A1 | 6/1991 | (DE) . |
| 40 00 678 A1 | 7/1991 | (DE) . |
| 41 00 937 A1 | 8/1991 | (DE) . |
| 40 11 291 A1 | 10/1991 | (DE) . |
| 41 34 268 A1 | 4/1992 | (DE) . |
| 42 13 132 A1 | 11/1992 | (DE) . |
| 41 24 496 A1 | 1/1993 | (DE) . |
| 42 02 083 A1 | 7/1993 | (DE) . |
| 42 02 737 A1 | 8/1993 | (DE) . |
| 42 30 510 C1 | 9/1993 | (DE) . |
| 42 25 683 A1 | 2/1994 | (DE) . |
| 43 30 193 A1 | 3/1994 | (DE) . |
| 43 18 949 C1 | 6/1994 | (DE) . |
| 43 39 252 A1 | 6/1994 | (DE) . |
| 43 91 898 C2 | 6/1994 | (DE) . |
| 43 44 053 A1 | 7/1994 | (DE) . |
| 43 11 697 A1 | 10/1994 | (DE) . |
| 43 14 290 A1 | 11/1994 | (DE) . |
| 43 23 601 A1 | 1/1995 | (DE) . |
| 43 23 602 A1 | 1/1995 | (DE) . |
| 44 04 791 C1 | 3/1995 | (DE) . |
| 295 02 906U1 | 4/1995 | (DE) . |
| 44 02 152 C1 | 4/1995 | (DE) . |
| 44 37 322 A1 | 5/1995 | (DE) . |
| 11 21 512 C1 | 6/1995 | (DE) . |
| 44 08 719 C1 | 7/1995 | (DE) . |
| 44 23 577 A1 | 8/1995 | (DE) . |
| 44 12 945 A1 | 10/1995 | (DE) . |
| 44 12 438 C1 | 11/1995 | (DE) . |
| 0 151 935 A1 | 8/1985 | (EP) . |
| 0 175 952 A2 | 4/1986 | (EP) . |
| 0 233 738 A1 | 8/1987 | (EP) . |
| 0 338 485 A2 | 10/1989 | (EP) . |
| 0 354 790 A2 | 2/1990 | (EP) . |
| 0 385 311 A2 | 9/1990 | (EP) . |
| 0 427 568 A1 | 5/1991 | (EP) . |
| 0 437 266 A2 | 7/1991 | (EP) . |
| 0 440 088 A1 | 8/1991 | (EP) . |
| 0 530 659 A1 | 3/1993 | (EP) . |
| 0 557 522 A1 | 9/1993 | (EP) . |
| 0 569 347 A2 | 11/1993 | (EP) . |
| 0 604 979 A2 | 7/1994 | (EP) . |
| 0 612 928 A1 | 8/1994 | (EP) . |
| 2481656 | 11/1981 | (FR) . |
| 2563280 | 10/1985 | (FR) . |
| 20 42 772 A | 9/1980 | (GB) . |
| 55005454 | 1/1980 | (JP) . |
| 58126434 | 7/1983 | (JP) . |
| 59184020 | 10/1984 | (JP) . |
| 61066820 | 8/1986 | (JP) . |
| 61200333 | 9/1986 | (JP) . |
| 62166749 | 7/1987 | (JP) . |
| 1113571 | 5/1989 | (JP) . |
| 1190922 | 8/1989 | (JP) . |
| 4024156 | 1/1992 | (JP) . |
| 05211258 | 8/1993 | (JP) . |
| 07105943 | 4/1995 | (JP) . |
| WO 88/08636 | 11/1988 | (WO) . |
| WO 91/16538 | 10/1991 | (WO) . |
| WO 94/19856 | 9/1994 | (WO) . |
| WO 95/02758 | 1/1995 | (WO) . |
| WO 95/24072 | 9/1995 | (WO) . |

OTHER PUBLICATIONS

N. Saridakis, "Golf mit Otto–Elektro–Hybridantrieb", *ATZ, Atutomobiltechnische Zeitschrift 87* (1985) 11, pp. 581–584.

H. Baumann, Siedekühlgefäss mit Luftrückkühlung für Traktionsstromrichter hoher Leistung:, *etzArchiv*, vol. 11, 1989, No. 7, pp 213–220.

E. Blessmann, "Magnetic Couplings", *Machine Design*, Feb. 9, 1989, pp. 105–108.

F. Simovert, "Spannungszwischenkreis–Umrichter Baureihe 6SC44 . . . der Fa. *Siemens* AG", 1985 No. A 19199–E319–A262.

D. Teodorescu, "Kleinantriebe mit Vollpolläufer–Synchronmotoren", *ema*, May 1993, pp 39–43.

"*Kraftfahrzeugtechnik*"Nov. 1982, pp 346–347.

Litton prospect "*Bürstenloser Hohlwellen–Resolver SSBH–15*", Unterföhring.

J. Reinert et al., "Digital Control and Optimization of a Rolling Rotor Switched Reluctance Maching", *IEEE Transactions on Industry Appliations*, Vo. 31, No. 2, Mar./Apr. 1995, p 338–344.

G. und H. Häberle, "Elektrische Maschinen in Anlagen der Engergietechnik", *Verlag Europa–Lehrmittel*, Haan–Gruiten, 3. Auflage, 1994, Seiten 169–172.

G. Henneberger, "Elektrische Motoraustruü stung", *Braunschweig*, 1990, pp. 98–103.

J. Langheim, J. Fetz: "Electric Citybus with two Induction Motors–Power Electronics and Motor Control", *ETEP*, vol. 2, No. 6, Nov./Dec. 1992, pp 359–365.

Robert Bosch GmbH, "Kraftfahrtechnisches Taschenbuch", *VDI–Verlag*, Düsseldorf, 21 ed. 1991, pp. 346–347; 361; 555–559; 763–767.

H. Deisenroth, C. Trabert: "Vermeidung von Überspannungen bei pulsumrichterantrieben" *etz*, vol. 114, 1993, No. 17, pp. 1060–1067.

W. Geissler, F. Unger–Weber: "Modelling the Three–Phase Propulsion System of a Modern Multisystem–Locamotive", *EPE Firenze*, (1991), pp. 4–632–4 637.

\* cited by examiner

DRIVE SYSTEM WITH DRIVE-MOTOR, ELECTRIC MACHINE AND BATTERY

This is a continuation of PCT/DE96/01663 filed on Aug. 31, 1996 which claims priority from German Patent Application Nos. 195 32 163.4 and 195 32 135.9 which were filed on Aug. 31,1995.

BACKGROUND OF THE INVENTION

1. Field of the Invention

The invention concerns a drive system with a drive motor, especially an internal combustion engine of a motor vehicle, and an electric machine.

2. Description of the Related Art

Drive systems of motor vehicles with internal combustion engine are traditionally equipped with two electric machines. One electric machine serves as a generator for power supply (dynamo), another one for starting the engine (starter).

Moreover, a motor vehicle has a battery, which takes on the function of a chemical accumulator of the energy produced in the dynamo. The energy stored in the battery is used for starting the motor vehicle, and also for operating electrical consumers.

Electric machines, internal combustion engine, and battery are attuned to each other for the particular application. The battery in drive systems of conventional motor vehicles is supposed to provide high currents, in order to accomplish the high starting power required in internal combustion engine. Furthermore, it must provide electrical energy for the electrical consumers, especially when the dynamo is not operated.

Traditionally, a lead/sulfuric acid storage battery is used in the motor vehicle (see Robert Bosch GmbH, "Automotive Engineering Handbook," VDI Verlag, Düsseldorf, 1991, p. 763ff.). This is characterized by high number of cycles and high reliability, while at the same time it is economical in cost. The known motor vehicle drive systems with lead/sulfuric acid battery have the disadvantage, however, of being limited in their power and energy density.

SUMMARY OF THE INVENTION

A drive system comprising a drive motor (1), an invertor-controlled rotary-current electric machine (4), which furnishes additional driving action, an invertor (14) with an intermediate circuit at a voltage level higher than a low-voltage network, at least one short-duty battery (11), which lies at the elevated voltage level of the intermediate circuit and which furnishes at least part of the energy required during the driving action of the electric machine (4).

BRIEF DESCRIPTION OF THE DRAWINGS

The invention shall now be explained more closely by means of sample embodiments and the enclosed schematic drawing. The drawing shows.

Parts of essentially the same function in the figures carry the same references.

DETAILED DESCRIPTION OF THE EMBODIMENTS

The present invention starts with the technical problem of improving the traditional drive systems, especially of motor vehicles.

It accomplishes this with a drive system with
- a drive motor, especially the internal combustion engine of a motor vehicle,
- an electric machine, which also provides driving action,
- and at least one short-duty battery, which furnishes at least some of the energy required when the electric machine is providing driving action (claim 1).

The drive system is arranged in a vehicle, especially in a motor vehicle. As its (primary) drive assembly, it has a motor, especially an internal combustion engine. The internal combustion engine is temporarily supported by an electric machine when driving the vehicle. Several motors and/or several electric machines can also be available. The electric machine(s) is/are energized by one or more short-duty batteries. These are heavy-duty as compared to the load of batteries in traditional drive systems of motor vehicles and they have a short discharge time. For this reason, the electric machine powered by the short-duty battery can provide a high additional drive power only sustainable over a short time (short-term acceleration, "boosting").

Thus, the drive system according to the invention furnishes a high-power accumulator for short-term additional acceleration reserves.

Such a drive system can provide a higher power than traditional systems for the same fuel consumption, or it can reduce the fuel consumption for the same power. The reason is as follows:

Average trips with motor vehicles are characterized in that long-lasting phases of less demand for drive power alternate with short-lasting phases of higher demand. For example, a short acceleration phase after the starting is followed by a long phase of driving at rather high constant velocity, followed by a brief acceleration phase when passing, and so on.

In traditional drive systems, the internal combustion alone furnishes the propulsion. Thus, it must furnish a low torque in the long-lasting phases of less demand on drive performance and a high torque in the short-lasting phases of higher demand on drive performance. In order to achieve independence of engine size, the torque furnished by the motor is related to its stroke volume (so-called effective mean pressure). Thus, the motor is operated relatively long in the region of less effective mean pressures (i.e., under partial load), and relatively briefly in the region of larger effective mean pressures (i.e., at or near full load).

Effective mean pressure and rotary speed establish the motor's operating point. The operating point significantly influences noise, exhaust emission, strain and specific fuel consumption of the motor.

The motor's specific fuel consumption (i.e., the fuel consumption as a ration of engine performance) is significantly influenced by the effective mean pressure, and only slightly by the rotary speed. At lower effective mean pressures, the specific fuel consumption is generally relatively high, whereas it is relatively low in general at higher effective mean pressures.

The motor's specific fuel consumption is inversely proportional to its efficiency. consequently, the motor of traditional drive systems is operated for long periods of time at low efficiency and for short periods of time at high efficiency. As a result, the overall efficiency is unfavorable and fuel consumption is high.

In the drive system according to the invention, on the other hand, the motor is advantageously designed smaller, i.e., such that it is already operated in the phases of lower demand on performance at or near full load, i.e., in the more energy-favorable region of higher effective mean pressures.

In phases of higher demand on performance, the electric machine, and not the motor, then provides the additional drive ("boosting"). The short-duty battery is designed such that its (short) discharge period is larger than the period of a phase of higher power demand. Even in phases of higher power demand when the system of motor and electric machine has lower efficiency than a motor providing the drive by itself, there is an increase in the overall efficiency. The reason is that, as explained above, the phases of higher power demand are shorter than the phases of lower power demand. Consequently, the drive system according to the invention is operated at high efficiency for long periods of time and at low efficiency for short periods of time. Hence, the overall efficiency is higher. Thus, the drive system according to the invention leads to lower fuel consumption and, thus, also to reduced emission of pollution.

Furthermore, the drive system according to the invention has the advantage of smaller structural size, lower weight, and lower cost. The reason is, on the one hand, the above-explained smaller design of the internal combustion engine and, on the other hand, the use of a heavy-duty battery with short discharge period (short-duty battery). Basically, it would also be possible to use an equally heavy-duty battery with longer discharge period, i.e., correspondingly higher capacity (and, thus, energy accumulation). But by virtue of manufacturing technology and materials used, batteries are more costly as their energy weight (in Wh/kg) and energy volume (in Wh/l) are higher. If using a heavy-duty battery with longer discharge period than a short-duty battery, this would result in larger size and heavier weight and/or higher costs.

Besides a heavy-duty battery, it would also be possible to use a light-duty battery. But since the power weight (in W/kg) and power volume (in W/l) of light-duty batteries are lower, the necessary power of the electric machine needed for the above-mentioned fuel economizing effect could only be achieved with large and heavy light-duty batteries. This would result in a large and heavy overall system using a light-duty battery, which in turn would result in increased fuel consumption. The system according to the invention with heavy-duty (short-duty) battery has instead the advantage of smaller size and less weight and, thus, also lower fuel consumption.

The drive system according to the invention, summarizing, thus has the advantages:
  low weight
  small size
  low cost
  low fuel consumption
  low pollution emission.

Thus, a light, compact, and economical drive system is provided, which lowers the fuel consumption as compared to traditional drive systems for the same maximum power and, thus, represents a step on the path toward consumption-optimized motor vehicles.

The drive system according to the invention also enables a higher maximum power as compared to traditional drive systems for the same fuel consumption.

The drive system according to the invention can be used as a drive for vehicles other than motor vehicles, for example, for ships or rail vehicles.

The motor is a piston type motor with internal combustion, such as an Otto or Diesel motor. A different internal combustion engine is also conceivable, such as a piston motor with external combustion (Sterling motor) or a rotary engine (e.g., Wankel engine).

The electric machine is any kind of machine for rotational or translational motions, which can work as an electric motor to drive the vehicle. It can be designed as a synchronous, induction or reluctance machine, and also especially in sector design.

The electric machine can be coupled directly or indirectly with the motor in order to drive the vehicle. For example, one part of the machine, especially the rotor, can be firmly coupled with the drive train of the motor, apply an additional torque to it, and thus produce additional drive for the motor. Moreover, the electric machine can transmit a torque to the drive train of the motor indirectly across one or more elements, such as pinions, across a connection piece on the crankshaft, etc., which further accelerates the motor.

But the electric machine can also drive the vehicle as part of a drive unit decoupled from the motor and in addition to the motor. For example, the electric machine can transmit a torque to its own drive train and thus additionally accelerate the motor.

Furthermore, the electric machine can also advantageously provide additional braking for the vehicle. The energy produced in this process can be saved at least partly in the short-duty battery (Claim 2). Thus, the electric machine will operate as a generator. It supports the mechanical brakes system when braking the vehicle. In the mechanical braking, the kinetic energy of the vehicle is transformed into heat, which is generally not reused. In electrical braking, however, kinetic energy of the vehicle is transformed into electric energy. Thanks to at least partial accumulation of the electric energy arising during the braking in the short-duty battery, this is further made available to the system (for example, for subsequent acceleration of the vehicle). The storing of brake energy in the short-duty battery results in further increase in the overall efficiency of the drive system.

A battery is generally a combination of two or more parallel or series connected galvanic cells. In contrast with a capacitor, in which the energy is essentially stored in an electromagnetic field, the storage in the case of a battery is basically electrochemical. One distinguishes between primary disposable and secondary rechargeable batteries. Preferably, according to the invention, secondary batteries (storage batteries) are used, which after being discharged can be returned to their original state by supplying an appropriate amount of energy and thus remain operational for a longer time.

The short-duty battery, as mentioned above, is heavy-duty as compared to the batteries in traditional vehicles and has a short discharge time.

Preferably, the discharge time of the battery is less than 7 minutes, especially 4 minutes (Claim 3). By discharge time is meant here the minimum duration between full charge and discharged state of the battery at highest permissible constant load duty. This (minimum) discharge time is oriented, first, to the duration of the short-lasting phases of higher demand on drive power that usually occur during use of the motor vehicle. The electric machine is energized in this process by the short-duty battery, which becomes (partially) discharged. Secondly, the duration of the phases of less power demand that lie between the phases of higher power demand must be taken into consideration. During such a phase, the battery will be charged. The battery should only be discharged to the extent that the time between two phases with higher power demand is essentially sufficient for the recharging.

Thanks to the short discharge time of the battery, one achieves a high power with simultaneously low capacity. Thanks to the low battery capacity, its weight, size, and cost can be kept low. This means that the drive system is also light, small, and economical.

The short-duty battery can be loaded with high currents. The maximum discharge current is more than 10 CA, in particular 15 CA (Claim 4). The pulse current is more than 100 A, especially 120 A (Claim 5). The discharge current is given in CA as a ratio of the rated capacity. For example, a battery with a rated capacity of 4 Ah is loaded with 0.1 CA at 400 mA, 1 CA at 4 A, and 1 CA at 40 A. The maximum discharge current is the maximum permissible current with which the battery can be loaded (from full charge to discharge) over a lengthy time. The pulse current is the maximum permissible current with which the battery can be loaded for a shorter time (two seconds).

Thanks to the high maximum pulse current, the electric machine energized by the short-duty battery can produce a very large drive power for a very short time, and thanks to the high maximum discharge current it can produce a large drive power for a short time. The large or very large drive power of the electric machine serves to support the internal combustion engine in the short phases of high demand on overall drive performance of the vehicle. Because of the large or very large drive power which can be produced by the electric machine, the internal combustion engine need only produce a relatively lower drive performance at this time. Therefore, it can be designed accordingly for lower drive performance, i.e., smaller. This means that, already in the long phases with low demand on overall vehicle performance (during which it alone furnishes the drive), it will operate at higher effective mean pressure (and, thus, higher efficiency). This achieves a high overall efficiency of the drive system.

Besides high pulse current and discharge current, the short-duty battery also preferably has a high power density of more than 250 W/kg, especially 300 W/kg (Claim 6). Therefore, weight and size of the short-duty battery and, thus, also of the drive system are kept low.

The short-duty battery has an overall capacity of less than 1200 Ah, especially 1000 Ah (Claim 7). Short-duty batteries, especially those with high power density and high power volume, require costly manufacturing materials and a costly production process. The costs of a battery of a certain power density and power volume are essentially determined by the overall capacity. The use of a low overall capacity battery thus leads to low costs for the drive system.

In the case of the drive system according to the invention, the short-duty battery is preferably a secondary alkaline system (Claim 8), preferably a nickel/cadmium system (Claim 9). Other alkaline batteries are also conceivable, such as nickel/iron systems (Claim 10). The advantage of alkaline systems, especially nickel/cadmium or nickel/iron systems, are high energy density, high energy volume, high power density and high power volume. The use of a short-duty alkaline battery thus leads to a drive system of small size and low weight. Furthermore, alkaline systems, especially nickel/cadmium and nickel/iron systems, have a long life in the discharged state, they are capable of deep discharge, can deal with operator error, can also be discharged at low temperatures, and are mechanically stable.

The short-duty battery contains sinter electrodes (Claim 11) or fiber-structure electrodes (Claim 12). The sinter electrodes can be designed as sinter plates or sinter foil plates. These employ a fine-mesh nickel wire grid or a thin perforated nickel band, which achieves a large active surface and a reduced internal resistance.

In the case of fiber-structure electrodes, the electrode consists of a three-dimensional polypropylene fiber structure, whose individual nickel-coated fibers are so thin that the active surface is further increased beyond that of sinter electrodes and the internal resistance is further reduced.

The large active surface and the small internal resistance result in high power and energy densities, as well as power and energy volumes. The use of short-duty batteries with sinter or fiber structure electrodes thus leads to a smaller and lighter drive system.

The short-duty battery is preferably designed such that the energy stored in it is also suitable for energizing the electric machine to start the internal combustion engine (Claim 13). The short-duty battery is characterized by heavy load duty and short discharge time. It should preferably handle those tasks in the vehicle which correspond to this design. The electric machine needs brief high current for the starting, as in the case of brief additional acceleration ("boosting"). Therefore, the short-duty battery is designed such in terms of capacity that a sufficiently large amount of energy is constantly kept in store for starting the engine. Thus, additional acceleration and starting occur from one and the same battery, which reduces the power electronic expense and keeps the size and weight of the overall system low.

The drive system is preferably designed such that the electric machine is coupled with the drive train of the motor, especially in a firm manner (Claim 14). The coupling can be indirect, say, by pinions, V-belt, a connection piece on the crankshaft, etc., so that the electric machine can indirectly transmit a torque to the drive shaft of the motor. Especially advantageously, one part of the machine, especially the rotor or the stator, is directly and firmly coupled to the drive shaft of the motor. It is advantageous that the electric machine can then directly counteract rotational nonuniformities of the drive shaft. Rotational nonuniformities occur from the gas and mass forces acting on the drive shaft in internal combustion engines.

These can be counteracted in that the short-duty battery is designed such that the energy stored in it is suitable for counteracting rotational nonuniformities, wherein the electric machine can apply an (additional) accelerating torque to the shaft in event of a negative rotational nonuniformity (Claim 15). The power required to reduce the rotational nonuniformities which occur in internal combustion engines may be very large. In particular, an electric machine energized by a traditional car battery cannot produce sufficiently large countertorque. On the other hand, as explained, the short-duty battery can be briefly heavily loaded, so that the electric machine can apply a sufficient countertorque to the drive shaft and thus effectively reduce rotational nonuniformities. This leads to an easing of the drive shaft and less driving noise. Moreover, the idling speed can be lowered.

Furthermore, rotational nonuniformities can also be reduced in that the electric machine applies an (additional) braking torque to the shaft in event of a positive rotational nonuniformity (Claim 16). Since the short-duty battery, as explained above, is advantageously a secondary battery, the energy obtained in such a process can be stored up in it. This has the advantage that the stored energy can be further used, for example, to counteract negative rotational nonuniformities, for boosting, or for starting.

Preferably, both measures are used jointly for optimal reduction of rotational nonuniformities. Thus, the shaft is loaded with a rapidly varying, alternating torque, namely, a driving torque for a negative rotational nonuniformity and a braking torque for a positive rotational nonuniformity.

Preferably, the short-duty battery is designed such that it can be charged with the energy gained when braking the shaft to reduce the drive slip (Claim 17). A reduction of drive slip is achieved by a lowering of the drive torque, especially by braking the shaft. Advantageously, the short-duty battery is charged with the energy gained in this process, which further reduces the fuel consumption. A lowering of the drive slip leads to better driving safety.

Likewise, the short-duty battery can be charged when the shaft is being braked for the purpose of a transmission synchronization, and also in a starting and shifting coupling of the electric machine. Accordingly, the energy stored up in the short-duty battery can be used for accelerating the shaft for transmission synchronization, and also in a starting and shifting coupling (Claim 18). This function, as well as the previously mentioned functions of acceleration and braking of the vehicle, starting of the engine, reduction of rotational nonuniformity, reduction of drive slip, etc., can be divided up among several electric machines. Especially advantageously, however, these functions will be handled by a single electric machine, energized by the short-duty battery. This ensures that the drive system has small size and lower weight and, moreover, is economical.

If the electric machine is operated with generator function, the resulting energy is used to charge the short-duty battery. Of course, the short-duty battery can also be charged from an additional battery. This—unlike the short-duty battery—advantageously has a low power/capacity ratio. Thus, the second battery cannot be highly loaded in terms of the energy stored up by it. This leads to a long discharge time with low discharge current. Thus, the drive system advantageously has a long-duty battery in addition to the short-duty battery (Claim 19). The long-duty battery serves advantageously to supply current to electrical consumers with low power, but high overall energy requirement (air conditioners, etc.), while the short-duty battery serves electrical consumers with high power, but low overall energy requirement. Lighter-duty batteries are more economical than heavy-duty batteries in terms of the capacity which they provide. Since the heavy-duty, short-duty battery is low-capacity and the lighter-duty, long-duty battery has high capacity, the costs of the overall system can be kept low. Thus, the invention has the advantage of furnishing a drive system in which the current supply is attuned to the particular type of consumer.

For this reason, a capacitor is also advantageously provided in addition to the short-duty battery (Claim 20). This has a lower capacity than the short-duty battery. On the other hand, it can be discharged and charged more quickly. Advantageously, it discharges the short-duty battery, especially during chores in which a very high power must be furnished or high energy amounts need to be stored up in a brief time, e.g., when reducing rotational nonuniformities.

The drive system advantageously has an invertor. This provides the currents and voltages of variable amplitude, frequency and phase that are needed by the electric machine to generate the electromagnetic fields (Claim 21). The short-duty battery is preferably connected to the intermediate circuit of the invertor (Claim 22). The same applies to the capacitor which supports the short-duty battery. The precise control capability with the invertor has the advantage of quickly and precisely counteracting the rapidly varying rotational nonuniformities.

Figure 1:
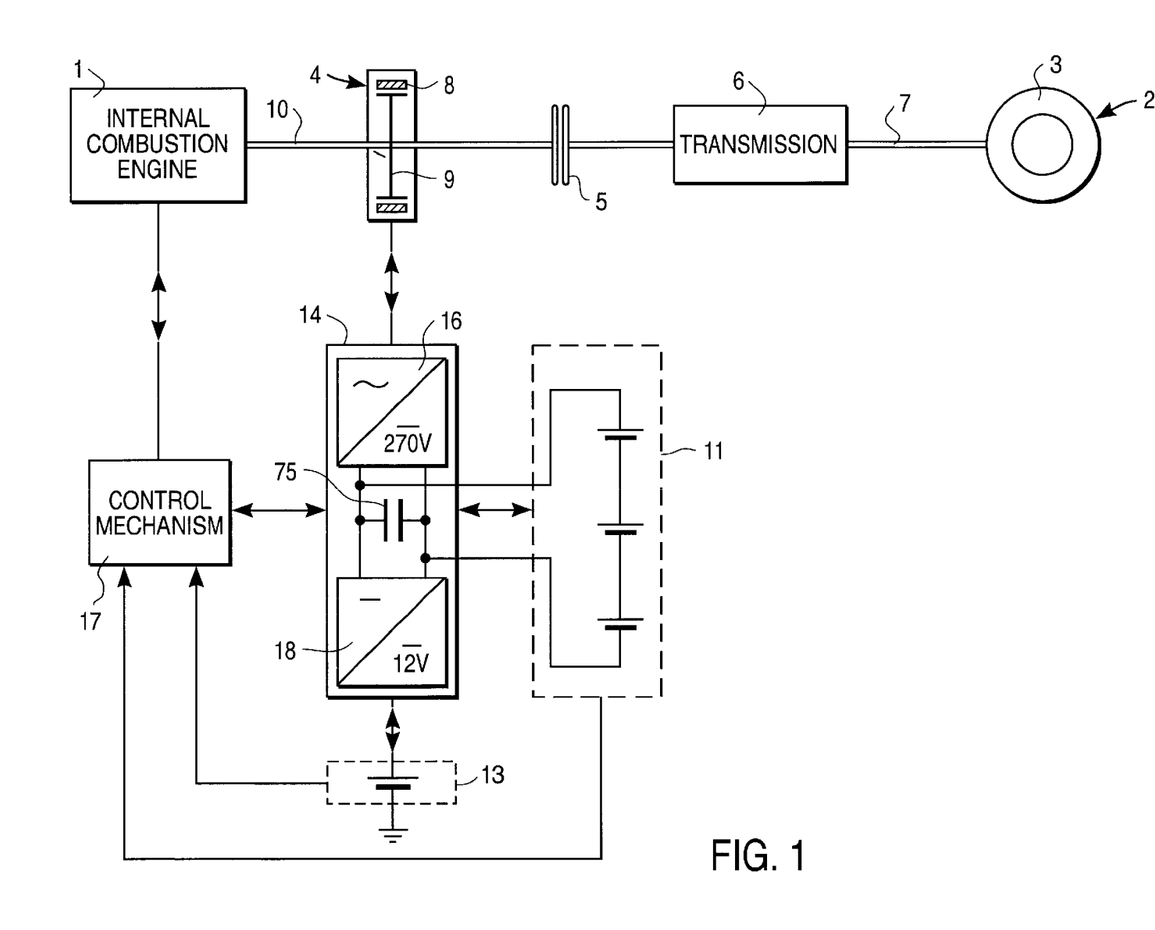
FIG. 1 a schematic representation of a first embodiment of the drive system, not to scale.

A drive system of a vehicle, e.g., a passenger car, per FIG. 1, has as its drive assembly an internal combustion engine 1, which can be a four-cylinder Otto motor. The torque generated by the engine 1 can be transmitted through a drive train 2 to drive wheels 3. In the takeoff direction there is arranged in the drive train 2 at first an electric machine 4 after the engine 1. Next comes a drive coupling 5, a transmission 6, and an axle drive 7, which transmits the torque to the drive wheels 3. In other embodiments (not shown), an additional coupling (activated by control system) is arranged in the drive train 2 between engine 1 and electric machine 4, in order to prevent the engine 1 from following along with the electric machine 4 when braking.

The electric machine 4—here, a rotary-current machine of induction or synchronous type—comprises a stator 8 and a rotor 9. The former is firmly propped against the engine 1, a vehicle chassis (not shown), or a clutch housing (not shown), whereas the latter sits on an extension of a crankshaft 10 of the engine 1 and is firmly coupled to it. Thus, they rotate together, without a transmission coming in between.

The electric machine 4 functions as an auxiliary motor ("booster"), e.g., to support the engine 1 when accelerating the vehicle. It also serves as a starter for the engine 1 and thus can also replace a separate starter traditionally provided in the motor vehicle.

Moreover, it functions as a generator for charging several short-duty batteries 11, a long-duty battery 13, and for energizing electrical consumers and thus replaces a dynamo traditionally present in the vehicle.

An invertor 14 furnishes the stator of the electric machine 4 voltage pulses which are pulse-width modulated at a high clock frequency 8, which under the action of the machine's inductance basically yield sinusoidal three-phase currents whose amplitude, frequency and phase are freely selectable.

The invertor 14 is an intermediate circuit type voltage invertor and comprises three assemblies: a dc voltage transformer 18 (input assembly), which transforms dc voltage from a low level (here, 12 V) to a higher intermediate-circuit level (here, 270 V) and vice versa, an intermediate-circuit electrical accumulator 15, here, a capacitor or an arrangement of parallel connected capacitors, and a machine invertor 16 (output assembly), which can generate from the intermediate-circuit dc voltage the (clocked) three-phase alternating voltage of variable amplitude, frequency, and phase, or—when the electric machine 4 is operating as a generator—can convert any such alternating voltages into the intermediate-circuit dc voltage.

The intermediate-circuit accumulator 15 is connected to several, here, 225 series-connected short-duty batteries 11, each of 1.2 V voltage rating (in the drawing, only three short-duty batteries are shown). An intermediate-circuit voltage of 270 V results.

Figure 2:
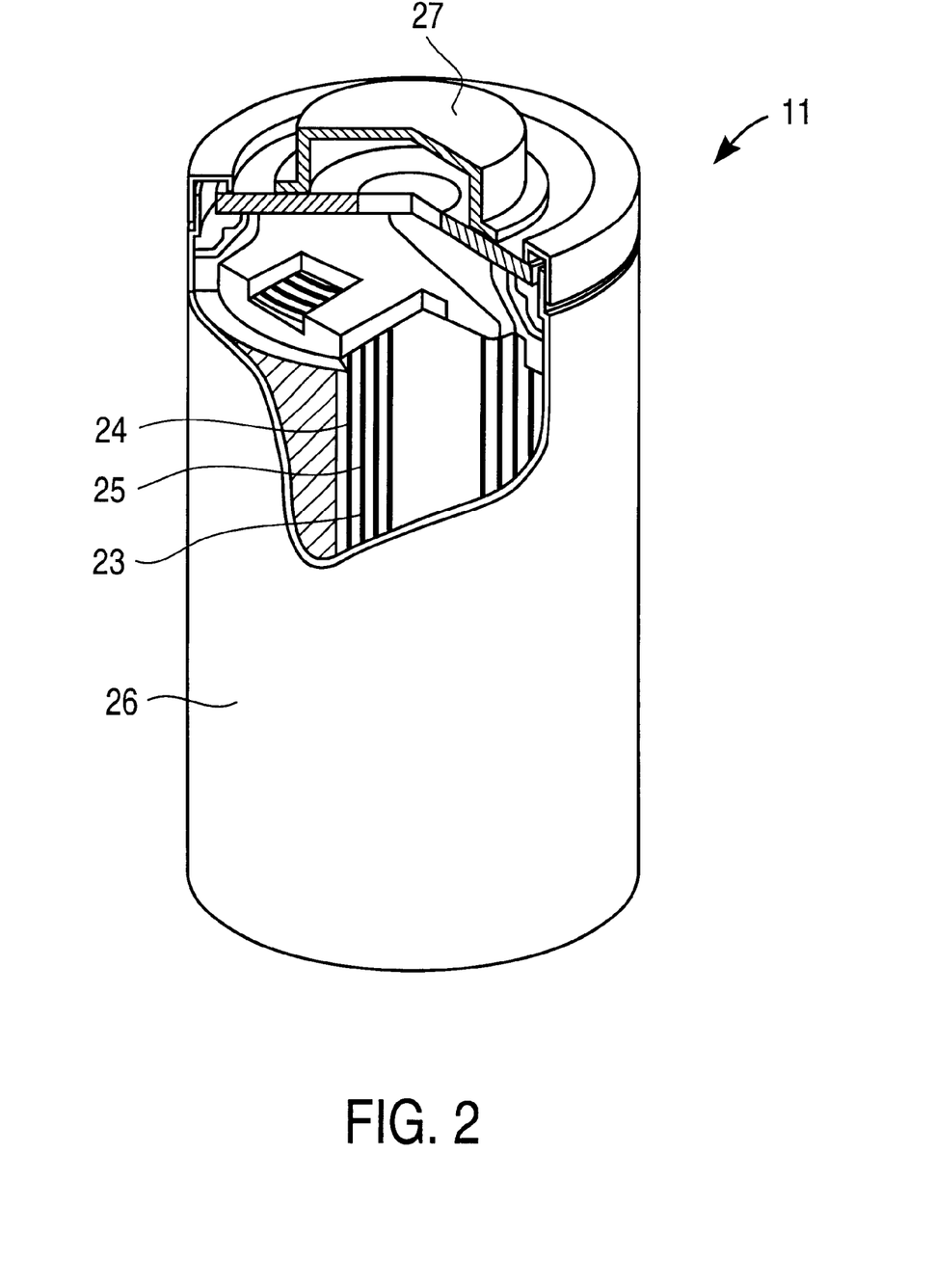
FIG. 2 a schematic cross section of the layout of a short-duty Ni—Cd battery.

The short-duty battery 11 of familiar basic form is represented in FIG. 2. It is a cylindrical secondary Ni—Cd system with positive sinter electrodes 23 and negative electrodeposit electrodes 24. These are highly porous, spirally wound carriers with large active masses. The electrodes 23, 24 are located in tightly closed, cylindrical steel housings. A plastic mat serves as separator 25. The housing is a cup 26 of nickel-plated steel sheet. The cup 26 at the same time serves as the negative pole, while the cover of the cell 27 serves as positive pole. The charge uptake is increased and, thus, the charge time kept low by the coatings of the negative electrode 24, which intensify the gas consumption, and additives in the positive electrode 23.

Each short-duty battery 11 can be continuously and heavily loaded with currents of up to 15 CA. The discharge time is then 4 minutes. A brief (up to 2 seconds) current pulse of 120 A is possible. The short-duty battery has a power density of 300 W/kg and a rated capacity of 4 Ah at 0.2 CA. It can be quickly charged with currents of up to 2 CA.

Such cylindrical Ni—Cd cells are usually employed in household appliances, power tools, and telephones, but not in traditional drive systems of motor vehicles.

The short-duty batteries 11 connected in series and connected to the intermediate circuit of the invertor 19, per FIG. 1, can produce a high power in a short time. This serves to provide the energy needed by the electric machine 4 for the additional short-term acceleration ("boosting"). Furthermore, the short-duty batteries 11 furnish the energy for starting the engine 1. Moreover, they supply various high-power consumers, such as an air conditioner and servo-drives (not shown), with electric energy. Whereas such high-power consumers are traditionally operated by mechanical coupling from the engine 1, the available high voltage level here enables a more efficient purely electrical drive.

Furthermore, the short-duty batteries 11 also serve to accumulate the energy which accrues when braking the vehicle by the electric machine 4.

In FIG. 1, the dc voltage transformer 16 of the invertor 14 can be connected at the low-voltage end to the long-duty battery 13 and various electrical consumers (not shown) with low power uptake, such as lights and electronic appliances. The invertor 14 can furnish current at low voltage level for charging the long-duty battery 13 and supplying the electrical consumers, on the one hand, and on the other it can remove current at low voltage level from the long-duty battery 13.

A control mechanism 17 tells the invertor 14 by appropriate actuation of its semiconductor switch at each moment of time the proper amplitude, frequency and phase of the alternating voltage generated by it, in order to bring about the driving or braking torque to be furnished by the electric machine 4.

The control mechanism 17 communicates with a plurality of additional control devices: An energy consumption controller (not shown) indicates how much energy is needed for charging the short-duty battery 11 and the long-duty battery 13 and for supplying the low-voltage and high-power consumers, so that the control mechanism 17 can provide a braking action of the electric machine 4 when necessary.

An engine controller (not shown) tells the control mechanism 17 whether and how intensively the electric machine 4 should produce driving action (e.g., to accomplish a starting or booster function) or braking action (e.g., to support the mechanical brake). At the same time, the engine controller also controls the power, torque, and fuel consumption of the engine 1 in terms of fuel intake, throttle valve positioning, fuel injection (time and quantity), ignition timing, etc.

Control of the system consisting of electric machine 4 and engine 1 depends on user-controlled quantities, such as gas pedal position, preselected driving velocity, selected transmission gear, activation of brake and clutch, previous driving characteristics, etc., and operating quantities such as rotary speed, crankshaft angle, torque, gas pressure, knocking, drive slip, driving velocity, etc.

In particular, the engine controller controls the system of electric machine 4 and engine 1 such that the engine 1 is operated predominantly, i.e., during the long-lasting phases of less demand on overall drive performance, in the energy-favorable region of higher effective mean pressures. The engine 1 alone then furnishes the drive of the vehicle.

During the short-lasting phases of higher demand on overall drive performance, e.g., when starting or when passing, the electric machine 4 supports the engine 1. Thus, the engine 1 can be designed smaller for the same maximum performance of the drive system.

Figure 3:
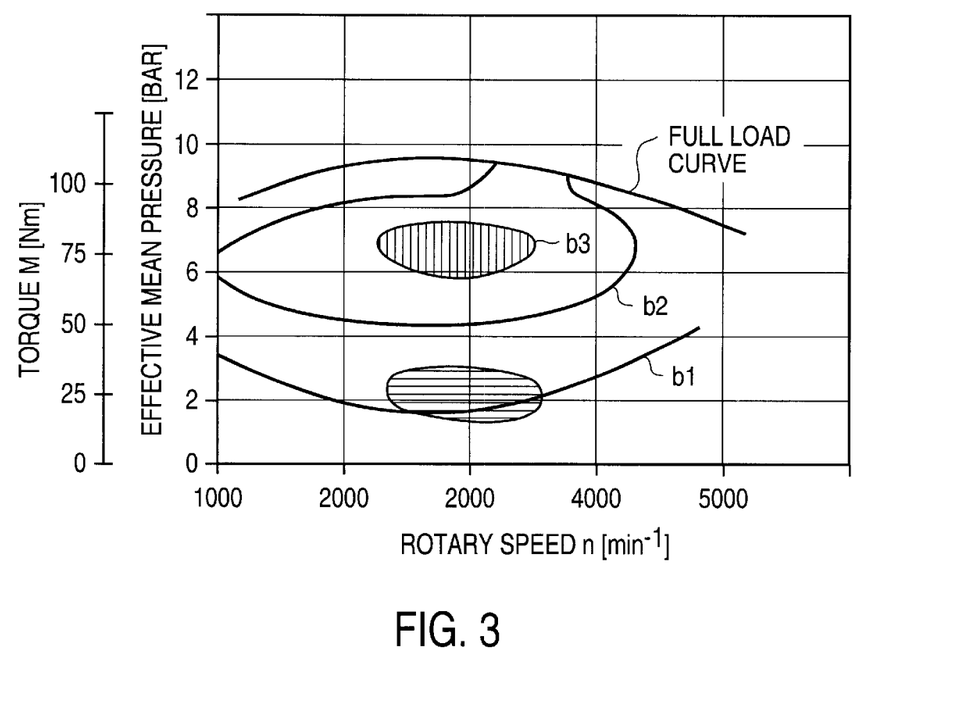
FIG. 3 a schematic representation of a consumption characteristic field of the internal combustion engine.

The resulting fuel economy is illustrated by FIG. 3. This shows the consumption characteristic diagram of a four-stroke Otto motor. Here, torque and effective mean pressure are plotted as the ordinate and rotary speed as the abscissa. The full load curve is plotted, as well as three lines b1, b2, b3 of constant specific fuel consumption. At b1, the motor 1 has a high specific fuel consumption, at b2 a medium one and at b3 a low one. It is clear that the specific fuel consumption to a large extent depends on the effective mean pressure, and to a small extent on the rotary speed. Also represented are the (mean pressure) regions in which engines of traditional drive system (lengthwise hatching) and that of the invented drive system (horizontal hatching) are operated during the long-lasting phases of low demand on overall drive performance. Thus, the internal combustion engine 1 is operated predominantly at low specific fuel consumption and, thus, at high efficiency.

For starting the engine 1, the engine controller can determine the nominal torque on the basis of values stored in memory, which specify the nominal time curve of the rotary speed or the torque of the electric machine 4 during the starting process, possibly supplemented by a measurement of these quantities and an automatic feedback control which ensures that the setpoints are observed.

Furthermore, a drive slip controller (not shown) makes the electric machine 4 operate temporarily as a generator-type brake when drive slip is present. A transmission synchronization controller (not shown) tells the electric machine to accelerate or brake the shaft for transmission synchronization.

Figure 4:
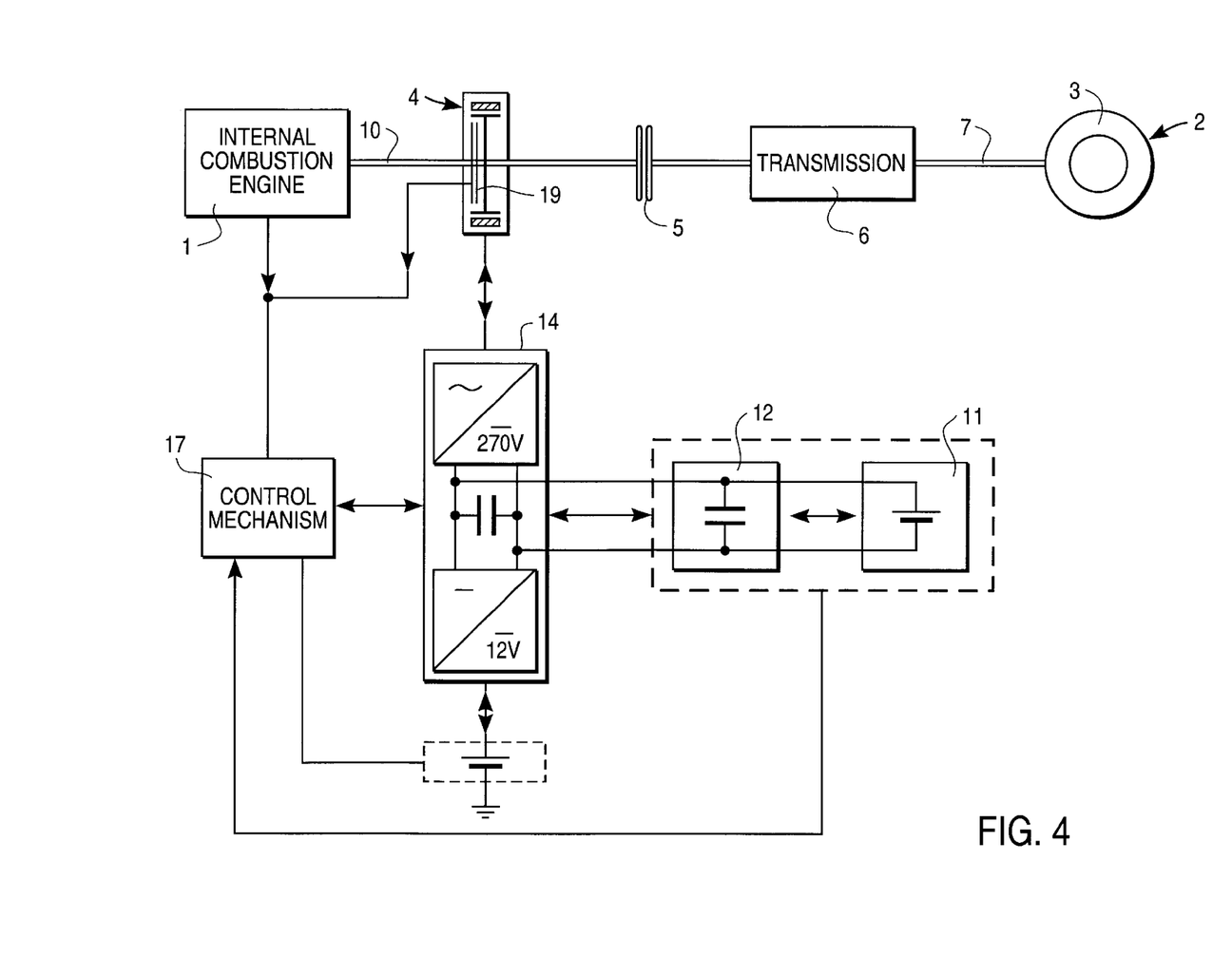
FIG. 4 a schematic representation of a second embodiment of the drive system, not to scale.
Figure 5A:
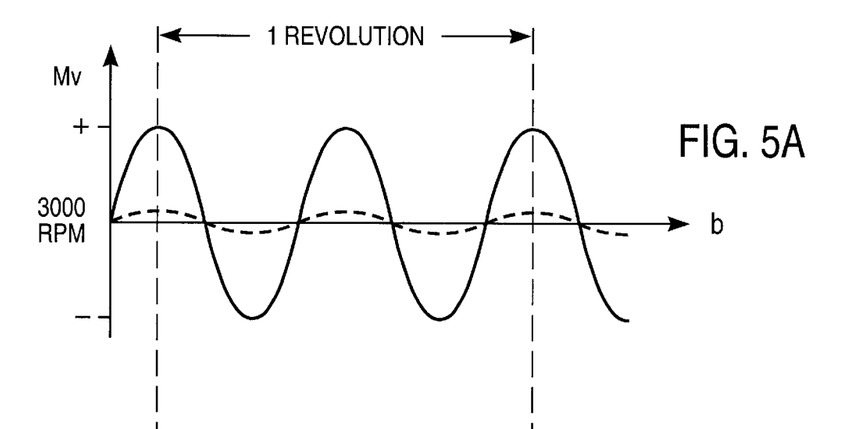
FIG. 5 a sample schematic representation of the mode of operation of the drive system of FIG. 4.

The embodiment represented in FIG. 4 is advantageous for counteracting rotational nonuniformities. FIG. 5a shows (solid line) the torque Mv of an engine 1 as a function of the crankshaft angle b. This periodically exhibits torque fluctuations of larger and smaller torque about a mean torque, which in this idealized example can have an essentially sinusoidal overall curve. The relatively large torque fluctuations are caused by the gas and mass forces operating in the engine 1.

Figure 5B:
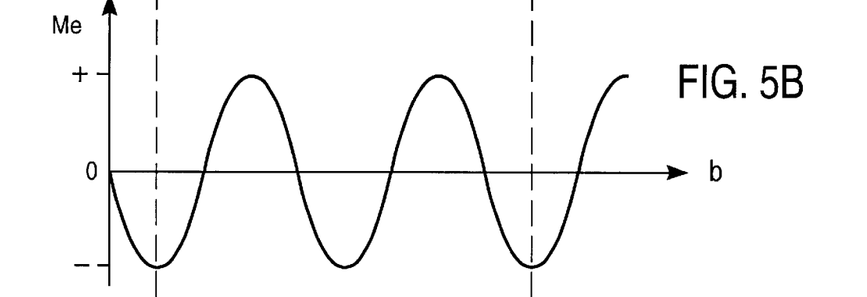

In FIG. 5b, the torque Me applied by the electric machine to reduce the torque fluctuations is represented as a function of the shaft angle b. This torque curve largely corresponds to that of the engine torque Mv, but is opposite in direction. The result is a reduction or even vanishing of the torque fluctuations Mv, as illustrated in FIG. 5a by the broken line.

In the operating mode shown in FIG. 5b, the negative and positive torque extremes are of the same magnitude. Thus, the energy obtained in a braking phase is basically the same size as the energy required in the following drive phase.

Figure 5C:
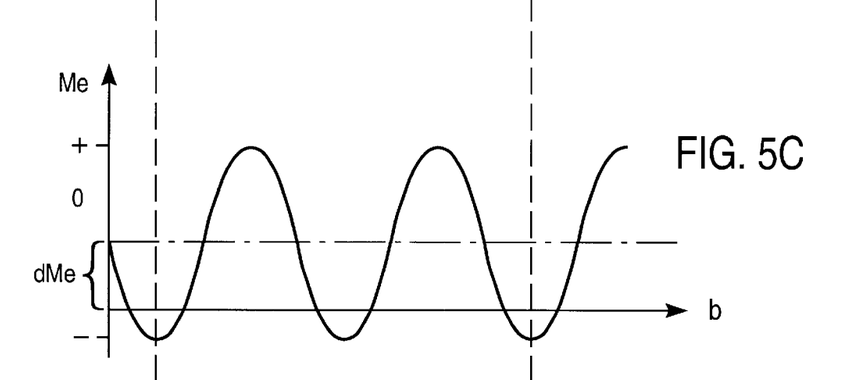

FIG. 5c shows an example of an operating mode of the system that is modified from the foregoing. The time curve of the total torque corresponds to that of FIG. 5b, but it is shifted in the positive direction by a certain amount dMe. Thus, on average, mechanical energy is supplied to the electric machine, by which a driving action, e.g., for brief acceleration, is accomplished.

If the total torque curve shown in FIG. 5b is shifted in the negative direction (not shown here), the electric machine 4 will act on average as a brake. The resulting energy is used, for example, to charge the short-duty battery 11.

When counteracting rotational vibrations or when applying an additional braking torque, mechanical energy is removed from the shaft/engine system and converted into electrical energy. The electric machine 4 then works like a generator.

According to FIG. 4, the electric machine 4 is equipped with a rotational transformer 19 (so-called resolver). This produces a signal, dependent on the angle of turn, which is sent to a control mechanism 18. This controls the invertor 14 such that rotational nonuniformities are counteracted in the manner described above.

When accumulating the energy arising upon reduction of a positive rotational nonuniformity, the short-duty battery 11 is supported by a capacitor 12. This also serves to furnish the energy needed to reduce a negative rotational nonuniformity.

Control of the torque to be applied by the electric machine 4 to reduce the rotational nonuniformities is accomplished through a control mechanism 17, for example, by using a characteristic diagram control system, in that the control mechanism 17 receives, as its input information, the angle position of the shaft 10, the momentary mean rotary speed, and possibly other operating parameters, such as the throttle valve position, and determines the rotational nonuniformity to be anticipated at the moment from a memorized characteristic diagram as a function of these operating parameters. Another possibility is to determine the rotational nonuniformities which are actually present. A combination of closed-loop and open-loop control is also possible.

From the value determined for the momentary rotational nonuniformity, corresponding (opposite-phase) values are derived for the rapidly varying torque to be applied by the active electromagnetic device, onto which a positive or negative auxiliary torque of desired strength may be additively superimposed.

Thus, a fuel-economizing, compact and light drive system is furnished, which can furthermore counteract rotational nonuniformities.

What is claimed is:

1. Drive system with
   an internal combustion engine (1) serving as a drive motor,
   an inverter-controlled rotary-current electric machine (4), which furnishes additional driving action,
   an inverter (14) with an intermediate circuit at a voltage level higher than a low-voltage network,
   at least one short-duty battery (11), which lies at the elevated voltage level of the intermediate circuit and which furnishes at least part of the energy required during the driving action of the electric machine (4).

2. Drive system per claim 1, in which the electric machine (4) also provides braking action and the energy generated in this can be saved up at least partially in the short-duty battery (11).

3. Drive system according to claim 1, in which the short-duty battery (11) has a discharge time of less than 7 minutes, especially 4 minutes.

4. Drive system according to claim 1, in which the maximum discharge current of the short-duty battery (11) is more than 10 CA, especially 15 CA.

5. Drive system according to claim 1, in which the pulse current of the short-duty battery (11) is more than 100 A, especially 120 A.

6. Drive system according to claim 1, in which the short-duty battery (11) has a power density of more than 250 W/kg, especially 300 W/kg.

7. Drive system according to claim 1, in which the short-duty battery (11) has an overall capacity of less than 1200 Ah, especially 1000 Ah.

8. Drive system according to claim 1, in which the short-duty battery (11) is a secondary alkaline system.

9. Drive system according to claim 1, in which the short-duty battery (11) is a nickel/cadmium system.

10. Drive system according to claim 1, in which the short-duty battery (11) is a nickel/iron system.

11. Drive system according to claim 1, in which the short-duty battery (11) has at least one sinter electrode (23).

12. Drive system according to claim 1, in which the short-duty battery (11) has at least one fiber-structure electrode.

13. Drive system according to claim 1, in which the short-duty battery (11) is designed such that the energy stored up in it is suitable for starting the internal combustion engine (1).

14. Drive system according to claim 1, in which the short-duty battery (11) is designed such that the energy stored up in it is suitable for counteracting of rotational nonuniformities of the shaft (10), wherein the electric machine can load the shaft (10) with an accelerating torque for a negative rotational nonuniformity.

15. Drive system according to claim 1, in which the short-duty battery (11) is designed such that it can be charged with the energy obtained when counteracting the rotational nonuniformities of the shaft (4), wherein the electric machine (4) can load the shaft (10) with an braking torque for a positive rotational nonuniformity.

16. Drive system according to claim 1, in which the short-duty battery (11) is designed such that it can be charged with the energy obtained when braking the shaft (10) to reduce the drive slip.

17. Drive system according to claim 1, in which the short-duty battery (11) is designed such that the energy stored up in it is suitable for accelerating the shaft (10) to provide transmission synchronization, and it can be charged with the energy obtained when braking the shaft (10) for the transmission synchronization.

18. Drive system according to claim 1, in which a long-duty battery (13) is also provided besides the short-duty battery (11).

19. Drive system according to claim 1, in which a capacitor (12) is also provided besides the short-duty battery (11).

20. Drive system according to claim 1, in which the electric machine (4) also serves as a starter for the internal combustion engine (1).

21. Drive system according to claim 20, in which the electric machine also provides braking action and the energy generated in this can be saved up at least partially in the short-duty battery.

22. Drive system according to claim 20 in which the short-duty battery has a discharge time of less than 7 minutes, especially 4 minutes.

23. Drive system according to claim 20, in which the maximum discharge current of the short-duty battery is more than 10 CA, especially 15 CA.

24. Drive system according to claim 20 in which the pulse current of the short-duty battery is more than 100 A, especially 120 A.

25. Drive system according to claim 20 in which the short-duty battery has a power density of more than 250 W/kg, especially 300 W/kg.

26. Drive system according to claim 20 in which the short-duty battery has an overall capacity of less than 1200 Ah, especially 1000 Ah.

27. Drive system according to claim 20 in which the short-duty battery is a secondary alkaline system.

28. Drive system according to claim 20 in which the short-duty battery is a nickel/cadmium system.

29. Drive system according to claim 20 in which the short-duty battery is a nickel/iron system.

30. Drive system according to claim 20 in which the short-duty battery has at least one sinter electrode.

31. Drive system according to claim 20 in which the short-duty battery has at least one fiber-structure electrode.

32. Drive system according to claim 20 in which the short-duty battery is designed such that the energy stored up in it is suitable for counteracting of rotational nonuniformities of the shaft, wherein the electric machine can load the shaft (10) with an accelerating torque for a negative rotational nonuniformity.

33. Drive system according to claim 20 in which the short-duty battery is designed such that it can be charged with the energy obtained when counteracting the rotational nonuniformities of the shaft, wherein the electric machine can load the shaft with an braking torque for a positive rotational nonuniformity.

34. Drive system according to claim 20 in which the short-duty battery is designed such that it can be charged with the energy obtained when braking the shaft to reduce the drive slip.

35. Drive system according to claim 20 in which the short-duty battery is designed such that the energy stored up in it is suitable for accelerating the shaft to provide transmission synchronization, and it can be charged with the energy obtained when braking the shaft for the transmission synchronization.

36. Drive system according to claim 20 in which a long-duty battery is also provided besides the short-duty battery.

37. Drive system according to claim 20 in which a capacitor is also provided besides the short-duty battery.

* * * * *